(12) United States Patent
Karpisek

(10) Patent No.: US 6,354,466 B1
(45) Date of Patent: Mar. 12, 2002

(54) VALVE ASSEMBLY FOR LINER BAGS OF CONTAINERS HAVING A LINER PUNCTURE/PIERCING MEANS

(76) Inventor: Ladislav Stephan Karpisek, 92 Woodfield Boulevarde, Caringbah, New South Wales 2229 (AU)

( * ) Notice: Subject to any disclaimer, the term of this patent is extended or adjusted under 35 U.S.C. 154(b) by 0 days.

(21) Appl. No.: 09/647,277
(22) PCT Filed: Mar. 2, 1999
(86) PCT No.: PCT/AU99/00115
§ 371 Date: Sep. 26, 2000
§ 102(e) Date: Sep. 26, 2000
(87) PCT Pub. No.: WO99/51504
PCT Pub. Date: Oct. 14, 1999

(30) Foreign Application Priority Data

Apr. 1, 1998 (AU) .............................................. PP2741

(51) Int. Cl.$^7$ ................................................ B67D 5/00
(52) U.S. Cl. ........................................ 222/83; 222/105
(58) Field of Search ........................... 222/81, 83, 83.5, 222/88, 105

(56) References Cited

U.S. PATENT DOCUMENTS

| | | | | |
|---|---|---|---|---|
| 4,440,316 A | * | 4/1984 | Christine | 222/83.5 |
| 4,475,670 A | * | 10/1984 | Rutter | 222/83 |
| 4,948,014 A | * | 8/1990 | Rutter et al. | 222/83 |
| 5,147,070 A | * | 9/1992 | Iwamoto | 222/81 |
| 5,379,918 A | * | 1/1995 | Goto | 222/83.5 |
| 5,429,273 A | * | 7/1995 | King et al. | 222/83.5 |
| 5,934,509 A | * | 8/1999 | Niss | 222/83 |

* cited by examiner

*Primary Examiner*—Joseph A. Kaufman
(74) *Attorney, Agent, or Firm*—Edwin D. Schindler

(57) ABSTRACT

A valve assembly having a body with a through bore in which a closure member is slidably mounted. There are sealing surfaces in the bore and on a head part of the closure member, respectively. The sealing surfaces are moved together and apart by a crank pivotally mounted in the body and having a crank pin engaged in slots in vanes of the closure member. A liner bag puncturing device on the head part of the closure member is housed in the through bore of the valve assembly when the sealing surfaces are in contact and can be moved to an extended position beyond the body of valve assembly body by the crank.

7 Claims, 3 Drawing Sheets

Figure 7:
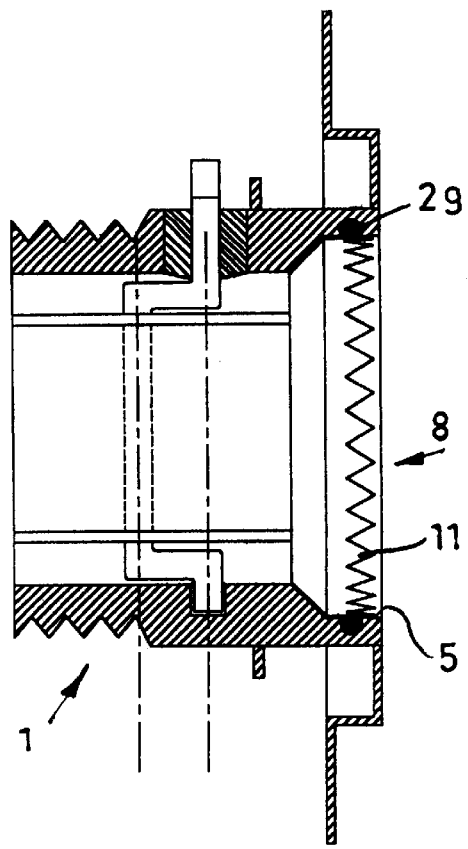

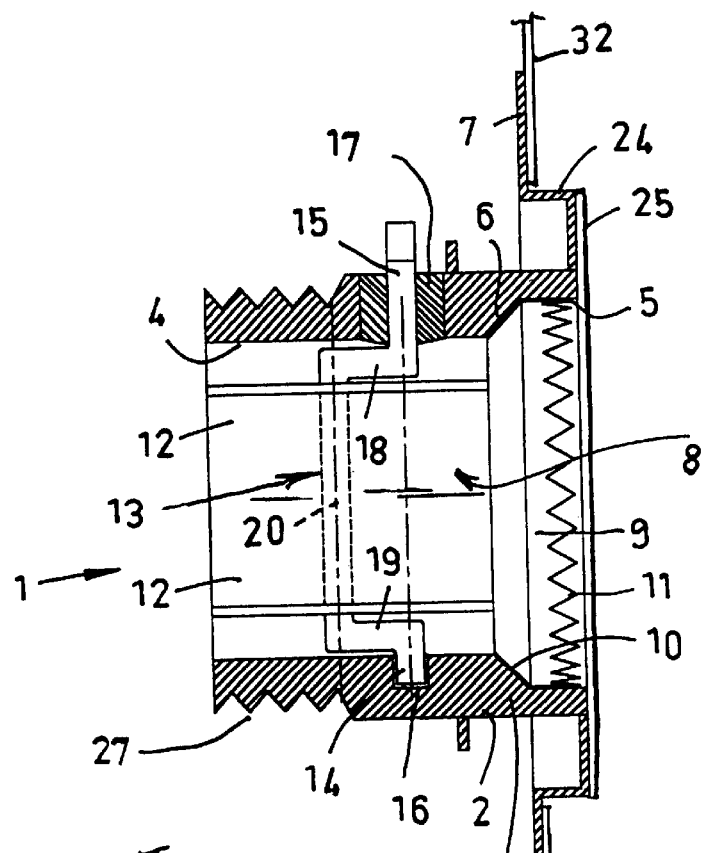
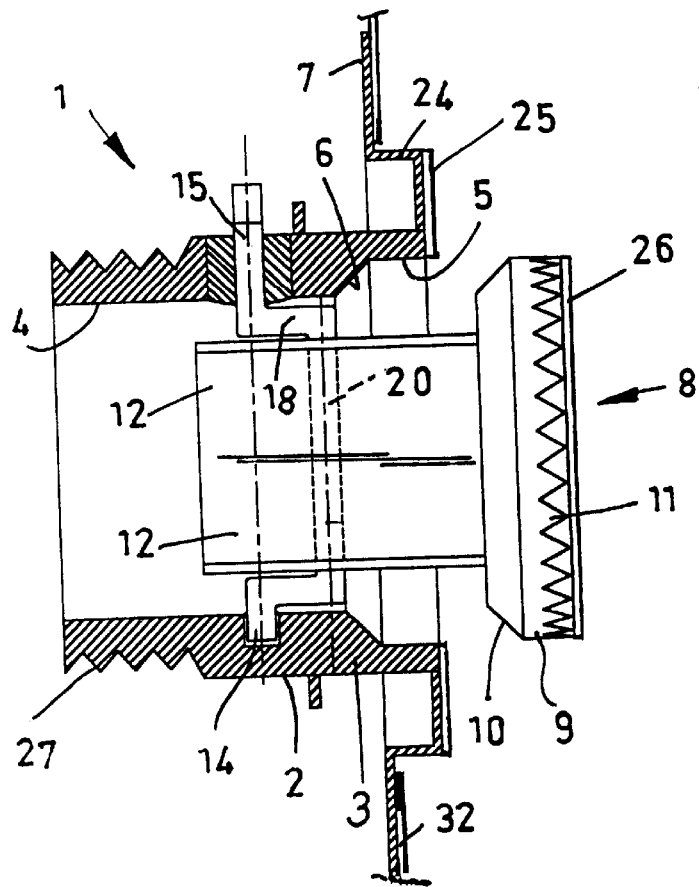

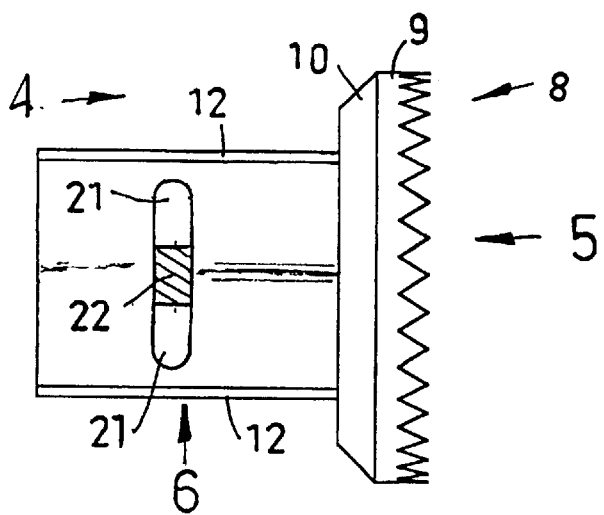
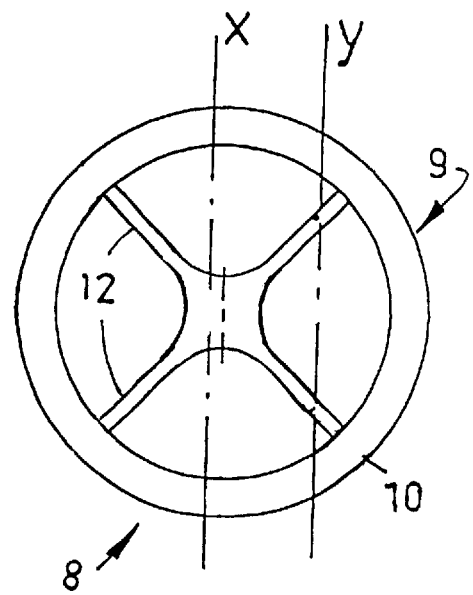
FIG. 3.
FIG. 4.
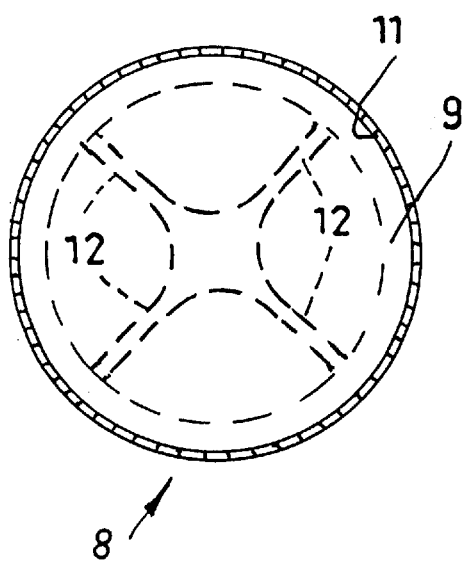
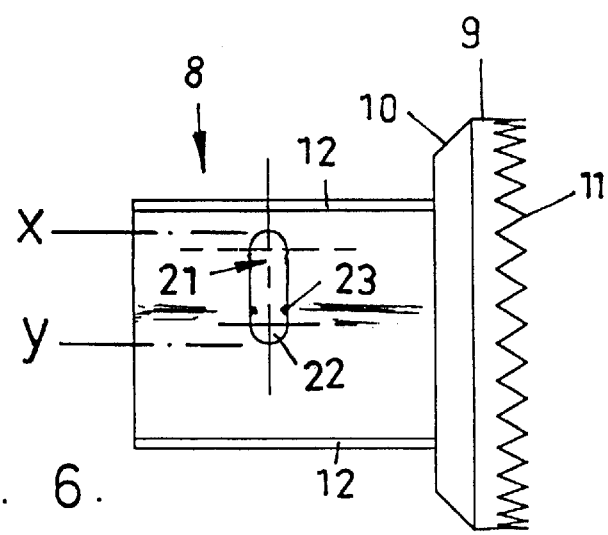
FIG. 5.
FIG. 6.

VALVE ASSEMBLY FOR LINER BAGS OF CONTAINERS HAVING A LINER PUNCTURE/PIERCING MEANS

FIELD OF THE INVENTION

This invention relates to valves for use with or for incorporation with liner bags as used in containers to house liquids. In the following description the term liquids is to be understood to mean materials which have a viscosity, either inherent or induced by heat or other means, which allows the material to flow under the influence of gravity. At the ends of the range of materials contemplated would be water and a material, such as lard, which is solid in its natural condition at room temperature, but when heated can flow and gravity discharge from a container.

BACKGROUND TO THE INVENTION

It is common practice to store and transport liquids in containers which include a base (conventionally adapted to act as a pallet with means to allow the use of a fork lift truck or a hand truck), four sides coupled to the base and a lid. A plastic film liner bag is located in the container to house the liquid. Discharge of the liquid is achieved through a nozzle mounted on the bag and accessible from outside the container.

In order to discharge the contents of the container several strategies have been developed. In one, a bottom discharge arrangement, the liner bag nozzle is in direct communication with the interior of the liner bag. The nozzle extends down into the base and then outwardly towards a side of the base. There is a manually operable butterfly or like valve in the nozzle to control the discharge of the liquid from the liner bag. The nozzle at its outlet end is threaded allowing a delivery hose to be coupled to the nozzle after the removal of a sealing cap, normally resident on the thread. The cap protects the nozzle thread against damage and prevents contamination entering the nozzle. The cap also serves a third and most important double security purpose. It ensures that any leakage through the butterfly valve when closed is contained in the nozzle and the cap usually has an associated tamper detection means. The liner bag and its butterfly valved nozzle is a one-use only item.

A bottom discharge liner bag with an integral nozzle with valve, as just described, is far more expensive than a liner bag with a nozzle for side discharge, another strategy in use for discharging liquid from containers. In the side discharge arrangement the nozzle has no valve. The nozzle is threaded at its outlet end for a cap. Because the nozzle bore is not in direct communication with the interior of the liner bag, being separated from the liner bag contents by a membrane over the inlet end of the bore of the nozzle, the cap does not need to be a sealing cap or include a tamper detection means. A one-use liner bag for side discharge is thus considerably cheaper than the one-use liner bag for a bottom discharge system. Cost is an important factor when the liner bag is used only once and then discarded.

In the side discharge arrangement the capped nozzle discharge end projects from a side of the container. In a discharge operation, the cap is removed and a membrane rupturing device is inserted into the nozzle. The rupturing device is forced against the membrane as a reusable valve is threaded onto the nozzle. It follows that as soon as the membrane is ruptured the liner bag contents will enter the nozzle but discharge from the nozzle is prevented by the coupled reusable valve until discharge of the liner bag contents is required.

Whilst the side discharge system has several economic and practical advantages over the bottom discharge system there has been a perceived need for a system which has the good features of both systems. The bottom discharge system has the advantage that the valve is part of the bag nozzle and is discarded with the bag, but the disadvantage that the membrane concept of the side discharge system cannot be utilized with known nozzle/valve assemblies.

OBJECT OF THE INVENTION

The present invention has been devised to provide a valve assembly for use with or incorporation with container liner bags, where the valve means acts as a discharge nozzle and is a self contained inexpensive disposable unit which incorporates a membrane puncturing arrangement.

GENERAL DESCRIPTION OF THE INVENTION

Broadly stated the invention provides a valve assembly including a body with a through bore having an inlet end and a discharge end, flange means on the body around and adjacent the inlet end of the body bore whereby the valve means can be secured to the wall of a liner bag for a container, a closure member movable along the body bore between a closed condition in which sealing means on the closure member and the body bore engage to isolate the inlet end of the body bore from the discharge end of the body bore and an open condition in which said sealing means are separated to place the body bore inlet and discharge ends in communication, membrane puncturing means on the closure member upstream from the sealing means on the closure member and manually operable closure member moving means whereby said closure member can be moved between said closed condition in which said membrane puncturing means lies within said body bore and a fully open condition in which said membrane puncturing means projects beyond the inlet end of the body bore.

GENERAL DESCRIPTION OF THE DRAWINGS

Figure 8:
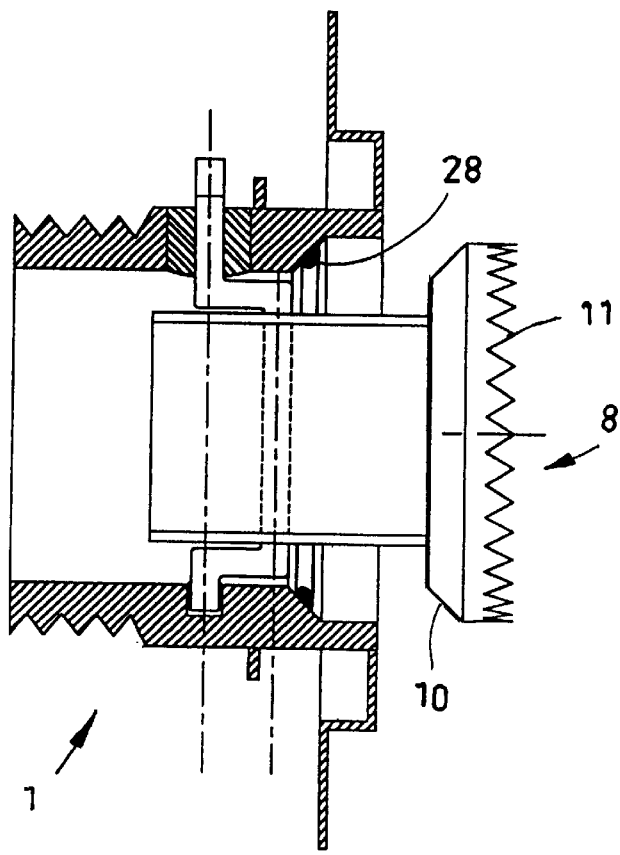

FIG. 1 is a sectional elevation of a first embodiment of the valve assembly of the present invention when in a closed condition, FIG. 2 is a view similar to FIG. 1 with the valve assembly in the fully open condition, FIG. 3 is a side view of the closure member of the valve assembly of FIGS. 1 and 2, FIG. 4 is an end view in the direction of the arrow 4 in FIG. 3, FIG. 5 is an end view in the direction of the arrow 5 in FIG. 3, FIG. 6 is a side view in the direction of the arrow 6 of FIG. 3, FIG. 7 is a view similar to FIG. 1 of a second embodiment of the invention and FIG. 8 is a view similar to FIG. 1 of a third embodiment of the invention.

DETAILED DESCRIPTION OF THE DRAWINGS

The valve assembly 1 illustrated has a body 2 with a through bore which includes a transition portion 3 separating a first circular cross-section bore part 4, extending between the transition portion 3 and a bore discharge end, from a larger diameter circular cross-section bore part 5, extending from the transition portion 3 to a bore inlet end. The bore transition portion 3 has an annular sealing face 6 facing towards the bore inlet end and lying in a plane inclined to the axis of the bore. The valve body 2 has a flange 7 whereby the valve body can be welded to the wall of a liner bag in one of several ways, as will be described later.

Slidably mounted in the body bore there is a closure member indicated generally as 8. The closure member 8 includes a head part 9, which in end view is circular, and a stem directed away from the head 9 towards the bore discharge end. The closure member head 9 has an annular rear face 10 which lies adjacent the stem and is in a plane at substantially the same angle to the axis of the closure member as is the face 6. As the face 10 is substantially parallel to the face 6 sealing contact between the faces 6 and 10 isolates the inlet end of the body bore from the discharge end of the body bore. The closure member head part 9, upstream from the sealing face 10, is provided with an upstanding thin annular ring on its end and there are teeth 11 along at least the major part of the annular ring.

The stem of the closure member extends away from the head part 9 as four vanes 12 radiating from a central stem spine 31 with the radial tips of the vanes 12 lying on the circumference of a notional circle with a diameter slightly less than the diameter of the bore part 4. The vane tips act as bearing surfaces engagable with the bore part 4 to provide guidance and support for the member 8 as it slides in the bore of the body 2. The configuration of the closure member 8 can be best seen in FIGS. 3–6.

The closure member 8 is moved along the bore of the body 2 by a cranked member 13 comprising a pair of shafts 14,15 respectively pivotally mounted in a blind hole 16 in the wall of the body 2 and in a bearing 17 mounted in the wall of the body 2. The shafts 14,15 share a common axis which lies diametrically across the body bore part 4. The shafts 14 and 15 are connected to a crank pin 20 by two crank arms 18,19.

The crank pin 20 is housed in a lateral and axially offset slot 21 in the closure member 8 which extends from the spine 31 through parts of two of the vanes 12. The length of the crank arms 18,19 is such that by rotating the cranked member 13 about the common axis of the shafts 14,15, as by a handle or the like on the portion of the shaft 15 extending from the body 2, the crank pin 20 will bear against a side of the slot 21 to move the closure member 8 relative to the valve body 2. Rotation of the shafts 14,15 through 180 degrees will move the closure member 8 from the FIG. 1 condition to the FIG. 2 condition. In the FIG. 1 condition the faces 6,10 are in sealing engagement. In the FIG. 2 condition the faces 6,10 are separated and the head of the closure member lies outside the body bore allowing free passage of liquid into the bore of the body around the head 9 of the closure member 8 to pass between the vanes 12 to the bore discharge end.

The slot 21 will now be described in detail with reference to the FIGS. 3 to 6 which are views as follows. FIG. 3 is a side view of the closure member 8. FIG. 4 is an end view in the direction of the arrow 4 in FIG. 3. FIG. 5 is an end view in the direction of the arrow 5 in FIG. 3. FIG. 6 is side view in the direction of the arrow 6 in FIG. 3.

The slot 21 has a width slightly larger than the diameter of the crank pin 20 thereby allowing sliding of the crank pin 20 in the slot 21 with a small working clearance. It will be seen from FIGS. 3 to 6 that the slots 21 in the vanes 12 have a common inner end 22 which extends into the spine 31 of the closure member 8. The shaded portion in FIG. 3 indicates the common end 22 of the slots 21 cut into the spine of the stem. The crank pin 20 at the two ends of its arcuate travel to move the closure member 8 in the body bore will have its axis intersecting the central axis of the spine 31 of the stem of the closure member 8.

The extremities of the slots 20 extending radially from the common end 22 into-two vanes 12 are indicated by the lines X & Y in FIGS. 4 and 6.

In FIG. 6 two small projections 23 are shown extending into the slots 21 and are preferred features. As will be understood the projections 23 narrow the width of the slots 21 and in theory prevent the crank pin 20 entering the end 22 of the slots. However, as the closure member 8 is made from a resilient plastic material the crank pin 20 can be forced (with resilient deflection of some or all of the projections, the vanes and the walls of the slot) into the end 22 of the slots where it is latched by the projections 23 until forcibly removed by rotation of the crank member 13. It would be possible to achieve the above result using only one projection 23.

The latching arrangement as just described hold the faces 6–10 in sealed condition when the closure member is in the FIG. 1 condition and also holds the closure member in the extended condition of FIG. 2. It will be understood that other latching means can be used, for example, a detent arrangement on the shaft 15 where it extends from the bearing 17. Whilst the latching arrangements proposed are desirable their function could be substantially duplicated by having (at least) the shaft 15 as a tight frictional fit in the bore of the bush 17.

The nozzle-valve as just described is welded to a liner bag for a container. In one arrangement a hole is made in the liner bag indicated 32 in FIG. 1, and the liner bag 32 is welded around that hole to the flange 7 of the body 2 with the body extension 24 projecting through the hole in the liner bag 32 into the interior of the liner bag. There is a membrane 25 welded to the body extension 24 to close off the inlet end to the body bore part 5. When the crank member 13 is rotated from the FIG. 1 condition to the fully open FIG. 2 condition it will cause the teeth 11 to first pierce and then sever (or partly sever depending upon the configuration of the tooth array 11) a membrane disk 26 from the membrane 25. In this way liquid housed in the liner bag and formerly sealed off from the bore of the body 2 by the membrane 25 is now able to access the valve body bore. Prior to piercing the membrane a delivery hose would be coupled to the threaded end 27 of the body 2. Preferably some means, such as a spike or pressure sensitive adhesive, would be associated with the head 9 of the closure member 8 to hold a severed membrane disk 26 captive. In an alternative arrangement, where the teeth 11 do not provide a complete severing means, the membrane portion severed will be in the form a flap. Again, a spike or a pressure sensitive adhesive or some other suitable means would be provided to prevent the flap interfering with the discharge of the liquid and the operation of the closure member.

In another embodiment of the invention, see FIG. 7, there is an O ring 29 or like continuous sealing ring member mounted in the body bore portion 5 and it engages the outer surface of the head 9 of the closure member 8. This form of seal could be used to replace the sealing achieved by the engagement of the faces 6,10 or to back-up that sealing engagement. If used as a back-up seal it would be possible to eliminate the membrane 25 and the teeth 11 on the closure member 8. However, experience has shown that the membrane method of positively separating the liquid contents of a liner bag from the nozzle/valve for discharging the liquid to be the most effective means of retaining liquid in a liner bag during storage and transport of the liquid.

In another embodiment of the invention, see FIG. 8, there is a sealing ring 28 mounted in the bore face 6 and the crank member 13 when operated would draw the closure member face 10 into compressing and sealing contact with the sealing ring 28. As will be understood the sealing ring 28 could be mounted on the face 10 of the closure member 8 and engage with the bore face 6.

The forgoing are preferred embodiments of a commercially viable economical one-use valve assembly for mounting on a lined bag for a container. It will be understood that changes can be made to the details of the embodiments disclosed without departing from the inventive concept herein disclosed.

One such change would be to have the flange 7 of the body in the same plane as the inlet end of the valve body bore, thereby eliminating the step 24, and by continuously welding the flange 7 directly to the liner bag wall as close as possible to the bore part 5, the liner bag overlying the inlet end of the valve body bore would act as the membrane 25. Naturally, it would also be possible, given the availability of suitable welding means, to retain the step 24 and weld the wall of the liner bag to the flange 7 and also to the end of the step 24. The liner bag wall would again provide the membrane 25.

In another modification, the double ended crank member 13 could be made with a robust shaft 15 and bearing 17, and the crank pin 20 could be supported by a single crank arm 18.

The vanes 12 as illustrated are axial and radial, it would be possible to make the vanes in other forms. For example, spiral or radial with slots or holes in the vanes to allow liquid flow along the closure member stem, whilst still having the required guidance and support of the closure member vanes from the bore part 4.

The valve body as illustrated is externally threaded. In a variation the bore part 4 could be internally threaded or means other than threads could be provided to allow coupling of a liquid delivery pipe to the valve body.

What is claimed is:

1. A valve assembly, comprising:
    a body with a through bore of circular cross-sectional shape having a first portion adjacent an inlet end of the through bore and a smaller parallel second portion;
    a shoulder in the through bore spaced from said inlet end of said through bore and separating the said first portion and said second portion;
    a valve;
    a flange on said body around the inlet end of said through bore of said body, so that said valve is securable to a wall of a liner bag for a container;
    a closure member housed in said through bore of said body;
    a head part on said closure member with an annular shoulder for engaging said shoulder of the through bore of said body for sealing said first portion of said through bore from said second portion of said through bore;
    a stem part of said closure member having radial vanes with outer edges in sliding contact with said second portion of the through bore of said body;
    liner bag puncturing means on said head part of said closure member, said liner bag puncturing means and said head part of said closure member being housed in said first portion of said through bore when said shoulders are in engagement;
    a crank member comprising two coaxial journal members with a crank pin disposed between said two coaxial journal members and offset from an axis of said two coaxial journal members, said two coaxial journals being pivotally supported in said body with said crank pin being engaged in radial slots in two adjacent said radial vanes, with pivotal movement of said crank member about the axis of said two coaxial journals causing said closure member to move from a first position wherein said shoulders are in engagement to a second position wherein said shoulders are separated, with said liner bag puncturing means extending beyond the inlet end of the through bore of said body.

2. The valve assembly according to claim 1, further comprising means for latching said crank pin in a latched position in said radial slots corresponding with engagement of said shoulders.

3. The valve assembly according to claim 2, wherein said means for latching includes yieldable slot width restricting means allowing for said crank pin to be forced passed said yieldable slot width restricting means for moving said crank pin into, and out of, said latched position.

4. The valve assembly according to claim 1, further comprising a resilient seal member mounted on a first of said shoulders and engagable by a second of said shoulders.

5. The valve assembly according to claim 1, further comprising a resilient seal member disposed between said first portion of said through bore and an exterior surface of said head part, said resilient seal member being under compression when said shoulders are in engagement.

6. The valve assembly according to claim 1, further comprising resilient "O"-ring housed in a groove in said first portion of said through bore and extending into said first portion for a sealing engagement with an exterior surface of said head part of said closure member when said shoulders are in engagement.

7. The valve assembly according to claim 1, further comprising a puncturable sealing membrane over the inlet end of said first portion of said through bore.

\* \* \* \* \*